(12) United States Patent
Shani et al.

(10) Patent No.: US 11,182,822 B2
(45) Date of Patent: Nov. 23, 2021

(54) AUTO-EXPANDING CAMPAIGN OPTIMIZATION

(71) Applicant: Albert Technologies Ltd., Tel-Aviv (IL)

(72) Inventors: Or Shani, New York, NY (US); Tomer Naveh, Tenafly, NJ (US)

(73) Assignee: Albert Technologies Ltd., Tel-Aviv (IL)

(*) Notice: Subject to any disclaimer, the term of this patent is extended or adjusted under 35 U.S.C. 154(b) by 642 days.

(21) Appl. No.: 15/139,519

(22) Filed: Apr. 27, 2016

(65) Prior Publication Data
US 2016/0314491 A1 Oct. 27, 2016

Related U.S. Application Data

(60) Provisional application No. 62/152,982, filed on Apr. 27, 2015, provisional application No. 62/152,989, filed on Apr. 27, 2015.

(51) Int. Cl.
G06Q 30/02 (2012.01)

(52) U.S. Cl.
CPC ..... *G06Q 30/0244* (2013.01); *G06Q 30/0275* (2013.01)

(58) Field of Classification Search
CPC . G06Q 30/02; G06Q 30/0244; G06Q 30/0275
See application file for complete search history.

(56) References Cited

U.S. PATENT DOCUMENTS

| 8,706,548 | B1 | 4/2014 | Blume et al. |
| 10,002,368 | B1* | 6/2018 | Els ..................... G06Q 30/0275 |

(Continued)

FOREIGN PATENT DOCUMENTS

WO  WO 2016/174678  11/2016

OTHER PUBLICATIONS

Deane, "Hybrid genetic algorithm and augmented neural network application for solving the online advertisement scheduling problem with contextual targeting" (published in Expert Systems with Applications on Apr. 2012) (Year: 2012).*

(Continued)

*Primary Examiner* — Abhishek Vyas
*Assistant Examiner* — Patrick Kim

(57) ABSTRACT

A computerized method of dynamically expanding an online advertisement campaign, comprising receiving from an advertiser an advertisement policy for an online advertisement campaign for offered item(s), the advertisement policy includes policy setting(s) and expanding the online advertisement campaign through multiple iterations. Each iteration comprises bidding to purchase candidate online advertisement space(s) of a plurality of available online advertisement spaces for small-scale use where the candidate online advertisement space(s) are selected by analyzing a performance of each of the available online advertisement spaces with respect to the online advertisement campaign according to the policy setting(s), placing an advertisement at the purchased online advertisement space(s) and determining a performance of the purchased online advertisement space(s) by calculating a performance score, adding the purchased online advertisement space(s) to a group of large-scale online advertisement spaces in case the performance score satisfies predefined criterion(s) and bidding for purchase of the group for large-scale use.

19 Claims, 5 Drawing Sheets

(56) References Cited

U.S. PATENT DOCUMENTS

| | | | |
|---|---|---|---|
| 2006/0212350 A1* | 9/2006 | Ellis | G06Q 30/0269 705/14.41 |
| 2008/0195462 A1 | 8/2008 | Magdon-Ismail et al. | |
| 2009/0106100 A1* | 4/2009 | Mashinsky | G06Q 30/08 705/14.1 |
| 2009/0216619 A1* | 8/2009 | Tavernier | G06Q 30/02 705/14.69 |
| 2011/0288928 A1* | 11/2011 | Patwa | G06Q 30/0256 705/14.42 |
| 2013/0080264 A1* | 3/2013 | Umeda | G06Q 30/02 705/14.69 |

OTHER PUBLICATIONS

International Preliminary Report on Patentability dated Nov. 9, 2017 From the International Bureau of WIPO Re. Application No. PCT/IL2016/050443. (7 Pages).

International Search Report and the Written Opinion dated Aug. 16, 2016 From the International Searching Authority Re. Application No. PCT/IL2016/050443.

Supplementary European Search Report and the European Search Opinion dated Jul. 26, 2018 From the European Patent Office Re. Application No. 16786075.8. (10 Pages).

Communication Pursuant to Article 94(3) EPC dated Jan. 2, 2020 From the European Patent Office Re. Application No. 16786075.8. (10 Pages).

\* cited by examiner

AUTO-EXPANDING CAMPAIGN OPTIMIZATION

RELATED APPLICATIONS

This application claims the benefit of priority under 35 USC 119(e) of U.S. Provisional Patent Application Nos. 62/152,989 and 62/152,982, both filed on Apr. 27, 2015, the contents of which are incorporated herein by reference in their entirety.

BACKGROUND

The present invention, in some embodiments thereof, relates to optimizing an online advertisement campaign, and, more specifically, but not exclusively, to optimizing an online advertisement campaign through automatic expanding the online advertisement campaign.

Online advertising is one of the most effective ways for businesses to expand their reach, find new customers, and diversify their revenue streams.

The online advertising takes advantage of a plurality of online advertisement spaces available at one or more online platforms, for example, websites, applications, games, services and/or the like. Posting an advertisement at the online advertisement spaces exposes the users of the online platforms to the advertised contents.

The online advertising may present high benefits to the advertiser however, it may also involve high costs required to setup and/or maintain an online advertisement campaign.

Efficient online advertising may rely on calculating and/or estimating the performance of the online advertisement spaces. For example, a conversion count of users exposed to the advertised content may be calculated with respect to the cost of the online advertisement spaces. The conversion count may be calculated for example as a relation between the number of users exposed to the advertised content at a specific online advertisement space and the number of users who took further action(s), for example, clicks, purchases, impressions and/or the like with respect to the advertised content.

SUMMARY

According to some embodiments of the present invention, there are provided a computerized method of dynamically expanding an online advertisement campaign, comprising:
  Receiving from an advertiser an advertisement policy for an online advertisement campaign for one or more offered items, the advertisement policy includes one or more policy settings.
  Expanding the online advertisement campaign through a plurality of iterations.
  Each iteration comprising:
    Bidding to purchase one or more candidate online advertisement spaces of a plurality of available online advertisement spaces for small-scale use. The one or more candidate online advertisement spaces are selected by analyzing a performance of each of the plurality of available online advertisement spaces with respect to the online advertisement campaign according to one or more of the policy setting.
    Placing an advertisement at the one or more purchased online advertisement space and determining a performance of each of the one or more purchased online advertisement space by calculating a performance score.
    Adding one or more of the purchased online advertisement space to a group of large-scale online advertisement spaces in case the performance score satisfies one or more predefined criteria.
    Bidding for purchase of the group for large-scale use.

The online advertisement campaign comprises one or more advertisement forms selected from a group consisting of: web advertisement and application advertisement.

The one or more policy setting relates to one or more of: the advertiser, the one or more offered item and the online advertisement campaign.

The performance score is calculated by analyzing a conversion count achieved by the advertisement placed at a respective one of the one or more online advertisement spaces compared to a price of the respective online advertisement space.

The expansion is executed to optimize a performance of the online advertisement campaign while complying within one or more campaign constraints provided by the one or more policy settings.

Optionally, the Internet is periodically explored to identify one or more new online advertisement spaces suitable for the online advertisement campaign initiated by the advertiser. The one or more new online advertisement spaces are added to the plurality of available online advertisement spaces.

The new online advertisement spaces are identified based on a similarity analysis of each of the new online advertisement spaces compared to the online advertisement campaign. The new online advertisement spaces share one or more similarity patterns with the online advertisement campaign.

The new online advertisement spaces are identified based on a similarity analysis of the new online advertisement spaces compared to one or more similar online advertisement spaces previously used for the online advertisement campaign. The one or more new online advertisement spaces share one or more similarity pattern with the one or more similar online advertisement spaces.

The one or more new online advertisement spaces are identified based on a traffic analysis of visitors exposed to an advertisement posted at each of the new available online advertisement spaces.

The one or more new online advertisement spaces are identified based on one or more competition advertisements posted by a competitor of the advertiser.

The one or more new online advertisement spaces are selected randomly.

Optionally, performance data is stored. The performance data comprises the performance score for each of the plurality of available online advertisement spaces.

The plurality of available online advertisement spaces is clustered based on an analysis of the performance data.

Optionally, one or more learning algorithms are applied to analyze the performance data to predict a performance of one or more online advertisement spaces not previously used for the online advertisement campaign.

Optionally, the one or more learning algorithms predict the performance for one or more of the available online advertisement spaces not previously used for one or more new online advertisement campaign.

The one or more learning algorithms predict the performance for the one or more available online advertisement space not previously used for the online advertisement campaign based on the performance data of one or more used online advertisement spaces. The one or more available online advertisement space not previously used for the online advertisement campaign share one or more similarity patterns with the used online advertisement spaces.

Optionally, one or more of the plurality of available online advertisement spaces is associated with one or more activation rules. The activation rules define one or more use characteristic for using the respective one or more available online advertisement space.

A bid price for the small-scale use is adjusted during the bidding for purchasing the one or more candidate online advertisement spaces such that a pre-defined minimum number of exposures of the one or more purchased online advertisement spaces is reached in order to allow calculation of the performance score.

A bid price for the large-scale use is adjusted during the bidding for purchasing one or more large-scale online advertisement spaces of the group to meet a performance goal of the online advertisement campaign.

One or more dropped online advertisement space are dropped from the group when the performance score of the one or more dropped online advertisement spaces fails to meet a performance goal of the online advertisement campaign.

One or more replaced online advertisement spaces of the group are replaced with the one or more candidate online advertisement spaces in case the performance score of the one or more candidate online advertisement space is better than the performance score of the one or more replaced online advertisement space.

The advertisement is created according to the one or more policy setting to fit the one or more purchased online advertisement spaces.

The advertisement incorporates one or more of a plurality of creative elements provided by the advertiser. The one or more creative elements are selected according to one or more pattern of the one or more purchased online advertisement space to fit the one or more purchased online advertisement space.

Optionally, the advertisement is updated to replace one or more of the creative elements with replacement creative element(s) of the plurality of creative elements based on a performance analysis of the advertisement with respect to the one or more creative element and the one or more purchased online advertisement space.

According to some embodiments of the present invention, there are provided a system for dynamically expanding an online advertisement campaign, comprising a program store for storing a code and one or more processors coupled to the program store. The one or more processors are adapted to execute the code, the code comprising:

Code instructions to receive from an advertiser an advertisement policy for an online advertisement campaign for one or more offered item. The advertisement policy includes one or more policy setting.

Code instructions to expand the online advertisement campaign through a plurality of iterations, each iteration comprising:

Bidding to purchase one or more candidate online advertisement spaces of a plurality of available online advertisement spaces for small-scale use. The one or more candidate online advertisement spaces are selected by analyzing a performance of each of the plurality of available online advertisement spaces with respect to the online advertisement campaign according to the one or more policy settings.

Placing an advertisement at the one or more purchased online advertisement spaces and determining a performance of each of the one or more purchased online advertisement spaces by calculating a performance score.

Adding the one or more purchased online advertisement spaces to a group of large-scale online advertisement spaces in case the performance score satisfies one or more predefined criteria.

Bidding for purchase of the group for large-scale use.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
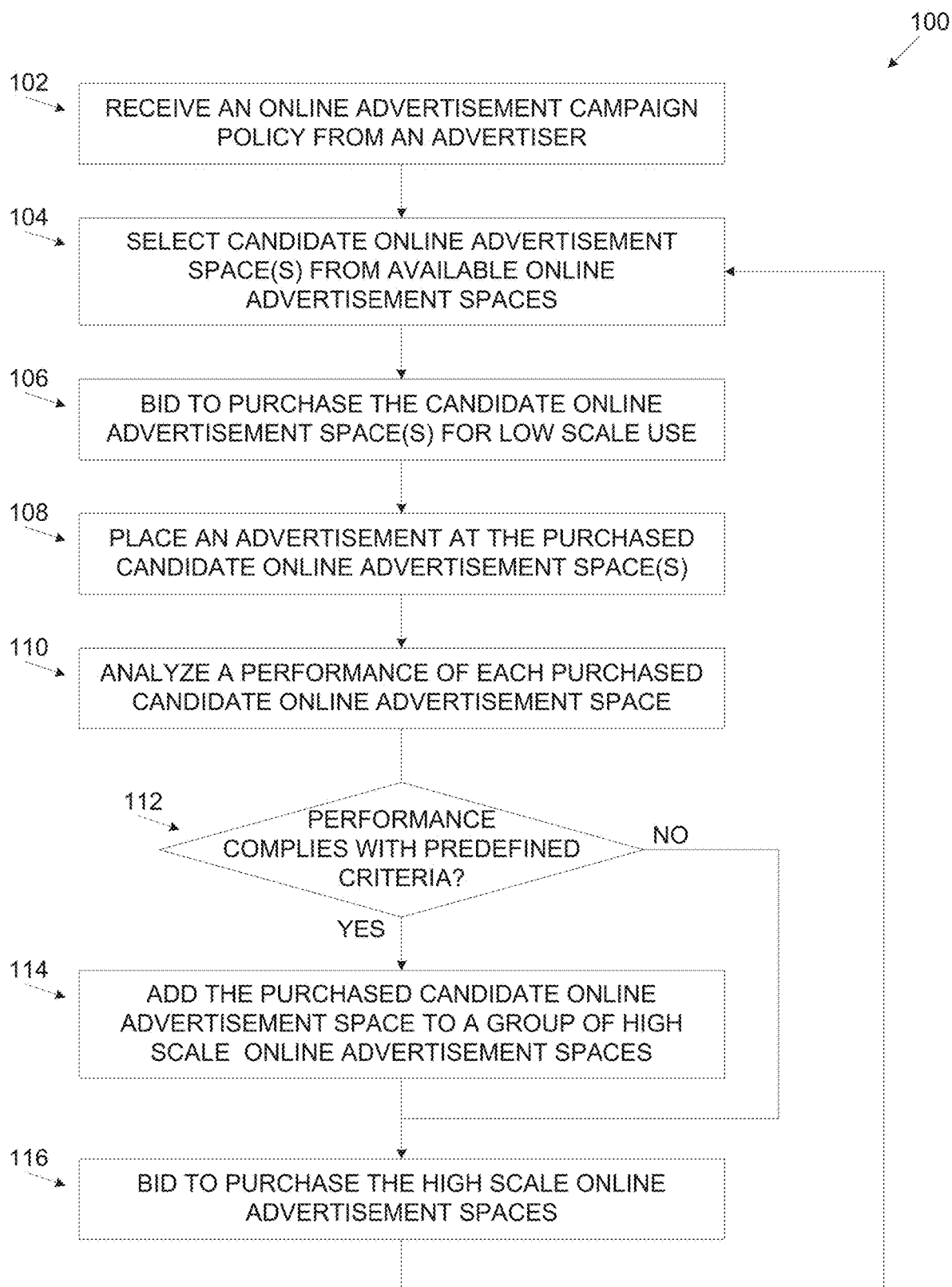
FIG. 1 is a flowchart of an exemplary process for optimizing performance of an online advertisement campaign through self-expansion, according to some embodiments of the present invention.

The present invention, in some embodiments thereof, relates to optimizing an online advertisement campaign, and, more specifically, but not exclusively, to optimizing an online advertisement campaign through automatic expanding the online advertisement campaign.

According to some embodiments of the present invention, there are provided methods and systems for optimizing an online advertisement campaign by automatically (self) expanding the online advertisement campaign according to a campaign policy provided by a user (advertiser). The online advertisement campaign in which advertisements are posted at a plurality of online advertisement spaces is focused at identifying online advertisement spaces that present best performance, i.e. effectivity. The performance may be measured by a conversion count achieved at each online advertisement space with respect to cost of the online advertisement space, where the conversion count indicates a number of visitors exposed to the advertisement content that take action with respect to the advertised content, i.e. action events. The term online advertisement space relates to a plurality of online advertisement techniques for exposing the advertised content to the visitors.

The self-expanding online advertisement campaign optimization employs a plurality of methods, algorithms and mechanism including machine learning for identifying a test group comprising candidate online advertisement spaces that are predicted to present high performance. The candidate online advertisement spaces are used for small-scale advertisement session(s) during which their performance is monitored and calculated. The candidate online advertisement spaces that in fact present high performance may be moved to an execution group comprising large-scale online advertisement spaces that may be used for the main online advertisement campaign session(s).

The self-expanding online advertisement campaign optimization uses intelligent bidding mechanisms for setting an optimal bid price for both the test group and the execution group online advertisement spaces. The bidding mechanism evaluates the tradeoffs of performance among the online advertisement spaces (in each of the groups) such that the best performing online advertisement spaces are identified and received the highest attention and/or investment (budget) available for the online advertisement campaign.

The self-expanding online advertisement campaign optimization is highly dynamic and continuously explores for new online advertisement spaces that may be beneficial for the online advertisement campaign, i.e. predicted to present best performance.

The self-expanding online advertisement campaign optimization may present significant advantages compared to currently existing online advertisement campaign management and/or optimization methods. The currently existing methods for optimizing online advertisement campaigns typically use a reduction and/or pruning approach. In the reduction approach, a large pool of online advertisement spaces is first selected, used during the online advertisement campaign, and monitored to determine their performance. Gradual convergence on the best performing online advertisement spaces is achieved through large-scale trial and error. This approach may present several drawbacks. First, the convergence process may be long as significant time periods may be required to assess the performance of the online advertisement spaces. Secondly, the process may be highly costly as many funds that may be a significant portion of the overall online advertisement campaign are invested in the trial and error process in which many of the tested online advertisement spaces present very poor performance. Moreover, once convergence is achieved, the currently existing methods may be very static, focusing on the identified best performing online advertisement spaces while missing opportunities to explore for new online advertisement spaces that may present better performance.

The self-expanding online advertisement campaign optimization on the other hand, employs a different approach. First, small-scale advertisement session(s) is conducted for candidate online advertisement spaces that are predicted to present high performance. The small-scale advertisement session(s) are set such that they provide enough performance data to calculate the performance of the online advertisement spaces. The candidate online advertisement spaces that present the best performance may then be used for large-scale advertisement session(s). This allows allocating a relatively low budget for identifying the best performing online advertisement spaces while investing most of the online advertisement campaign's funds (budget) to purchase the large-scale online advertisement spaces that naturally contribute the main conversion benefits to the online advertisement campaign. Moreover, by employing sophisticated methods including intelligent machine learning, the candidate online advertisement spaces that are predicted to present high performance may be quickly identified, thus significantly shortening the convergence period.

Moreover, the self-expanding online advertisement campaign optimization is highly dynamic, constantly exploring the internet for new advertisement spaces opportunities to prevent fixation on a small known online advertisement spaces. The pool of available online advertisement spaces is continuously refreshed and/or expanded to allow new candidate online advertisement spaces to be evaluated.

Furthermore, while the currently existing methods may use "bulks" of online advertisement spaces, the self-expanding online advertisement campaign optimization is focused on individual online advertisement spaces. This may further improve the budget utilization for the online advertisement campaign since the "bulks" may be misleading with respect to their performance. The "bulk" may present a relatively high average performance, however looking into the "bulk" it may be found that there are some online advertisement spaces that present very high performance, while other present low performance. While the average performance may be acceptable, it is desirable to focus on the high performing online advertisement spaces and drop the low performing online advertisement spaces. The self-expanding online advertisement campaign optimization selects and monitors each of the online advertisement spaces individually thus the high performing online advertisement spaces are identified and maintained while the low performing online advertisement spaces are dropped.

In addition, the self-expanding online advertisement campaign optimization provides a simple, user friendly and straightforward user interface allowing the user to define only basic settings for the online advertisement campaign while the majority of the settings that may be required for configuring and/or managing the self-expanding online advertisement campaign optimization are automatically generated. The simplified user interface coupled with the automatically derived settings may serve to enhance the performance and/or utilization of the self-expanding online advertisement campaign optimization compared to the currently existing online advertisement campaign management and/or optimization methods.

The currently existing methods may allow the user high degree of freedom in setting the online advertisement campaign settings and may lead to a non-optimal overall online advertisement campaign performance. The non-optimal performance may result from conflicting settings set by the user and/or from non-optimal setting(s) values set by the user. Such conflicting and/or non-optimal settings may be resolved as part of the self-expanding online advertisement campaign optimization that may select the setting(s) for optimal performance based on analytics information and/or learning algorithms analyzing characteristics and/or performance of multiple past online advertisement campaigns.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is flowchart of an exemplary process 100 for optimizing performance of an online advertisement campaign through self-expansion, according to some embodiments of the present invention. The process 100 is executed to optimize performance of the online advertisement campaign by testing performance of candidate online advertisement spaces during a small-scale advertisement session. Candidate online advertisement spaces that present high performance may be transferred to a pool of large-scale online advertisement spaces that may be used for high scale advertisement sessions. The process 100 employs several intelligent mechanisms for efficiently expanding the online advertisement campaign while complying with the online advertisement campaign constraint(s). The performance of each of the online advertisement spaces is continuously monitored and calculated such that low performing online advertisement spaces may be dynamically and efficiently replaced with better performing online advertisement spaces. The process 100 applies a plurality of methods to identify candidate online advertisement spaces that may be suitable for the online advertisement campaign and present high performance by continuously learning performance patterns of available online advertisement spaces.

Figure 2:
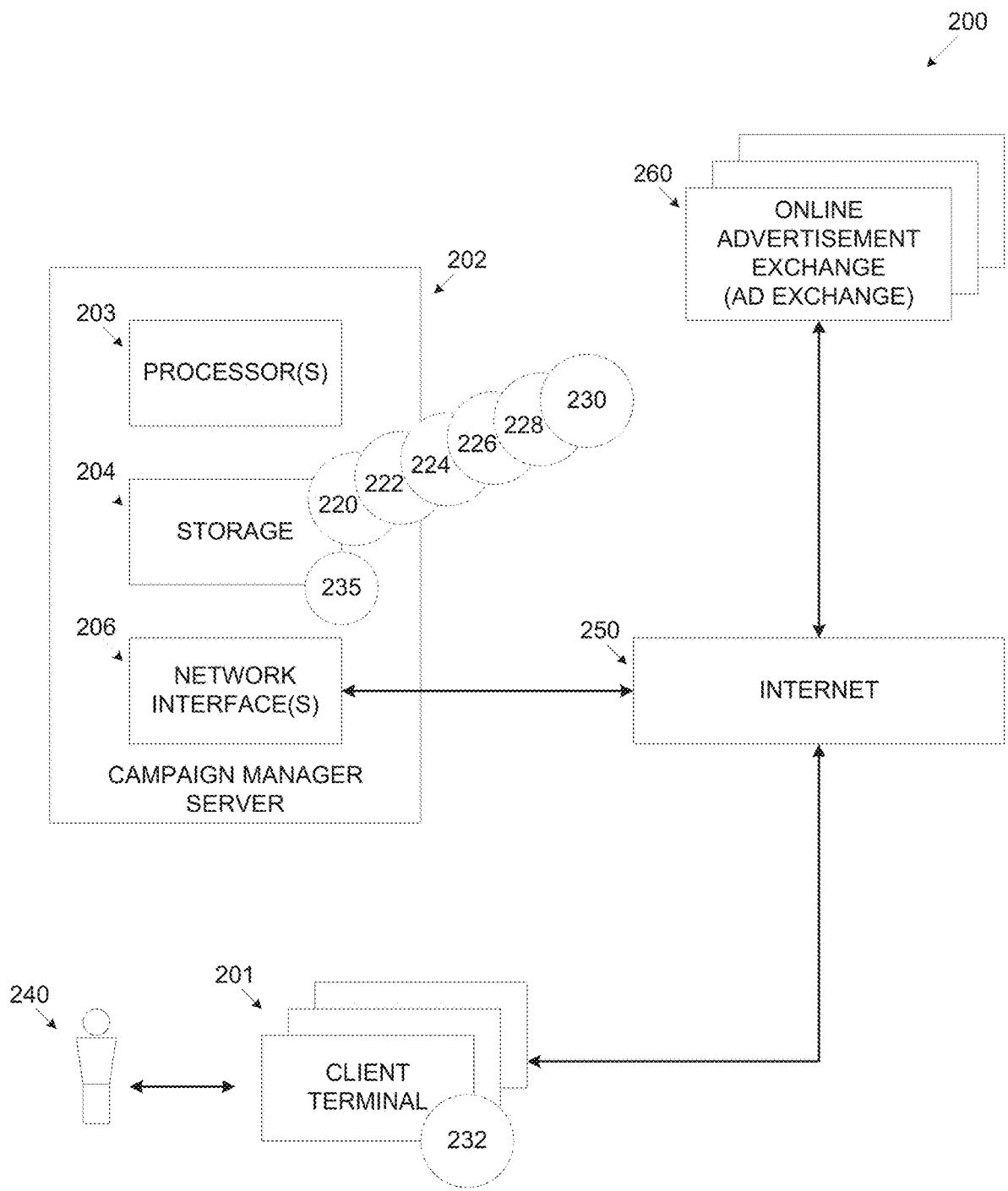
FIG. 2 is a schematic illustration of an exemplary system optimizing performance of an online advertisement campaign through self-expansion, according to some embodiments of the present invention.

Reference is also made to FIG. 2, which is a schematic illustration of an exemplary system 200 for optimizing performance of an online advertisement campaign through self-expansion, according to some embodiments of the present invention. The system 200 includes a campaign manager server 202 that communicates over the internet 250 with one or more client terminals 201 such as, for example, a computer, a laptop, a Smartphone, a tablet, a server and/or the like. The campaign manager server 202 is capable of exploring the internet 250 to communicate with one or more advertisement (AD) exchanges 260 offering a plurality of online advertisement spaces. The AD exchanges 260 are technology platforms that facilitate the buying and selling of online advertising inventory from multiple advertisement networks, channels, websites and/or applications. The AD exchanges 260 further provide means for price negotiation through bidding for purchasing the offered online advertisement spaces. The online advertisement spaces refer to a plurality of online advertisement techniques for exposing an advertised content to visitors (advertisement audience) visiting a website and/or using an application.

The online advertisement techniques include web advertisement and/or application advertisement. Web advertisement relates to advertisements(s) exposed to the visitors that visit and/or browse the internet 250, for example, a website, a domain and/or the like. Application advertisement relates to advertisement(s) displayed as part of application(s) use and exposed to the visitors who are in fact users of the application(s). The online advertisement techniques may take one or more of a plurality of forms, visual and/or audible, for example, text, logos, animations, videos, photographs, or other graphics. The online advertisement spaces 260 may be provided through, for example, display advertising provided by websites, mobile application advertising, email advertising, instant messaging advertising and/or the like.

The campaign manager server 202 includes a processor(s) 203 for executing a process such as the process 100, a storage 204 and one or more network interfaces 206 for connecting to the internet 230 via one or more networks to communicate with the client terminal(s) 201 and/or to identify the online advertisement spaces 260. The processor(s) 202, homogenous or heterogeneous, may be arranged for parallel processing, as clusters and/or as one or more multi core processor(s). The storage 204 may include one or more non- transitory, non-volatile devices, for example, a hard drive, a Flash array and the like. The storage 204 may perform as a program store for storing one or more software modules such, for example, a campaign editor 220, an AD (advertisement) space fisher 222, an AD space utilizer 224, an AD space bidder 226, an AD builder 228 and a performance monitor 230. Wherein a software module refers to a plurality of program instructions stored in a non-transitory medium such as the storage 204 and executed by a processor such as the processor(s) 203. The storage 204 may further comprise one or more network storage devices, for example, a storage server, a network accessible storage (NAS) a network drive, and/or the like.

The storage 204 may be used for storing a performance database 235 comprising performance data for a plurality of available online advertisement spaces. The network interface(s) 206 may include a local area network (LAN), a wide area network (WAN), a cellular network and/or the like. The campaign manager server 202 may be implemented through one or more networked processing nodes, for example, a server, a processing cluster comprising a plurality of processing nodes and/or the like. Optionally, the campaign manager server 202 is implemented as a cloud service for example, a software as a service (SaaS), a platform as a service (PaaS) and/or the like.

Each of the client terminals 201 also includes a processor such as the processor(s) 203, a storage such as the storage 204 and one or more network interfaces such as the network interface(s) 206. The client terminal(s) 201 further include a user interface 208 for interacting and receiving instructions from one or more users (advertisers) 240. The user interface 208 may include one or more human interface devices, for example, a keyboard, a mouse, a touchpad, a display, a touchscreen and the like for interacting with the user 240 through, for example, a graphic user interface (GUI) provided by an operating system (OS) executed on the client terminal 201. The client terminal(s) 201 may execute one or more software modules, such as for example, a campaign editor user interface 232 executed by the processor(s) 203 of the client terminal(s) 201 from the storage 204 of the client terminal(s) 201. The campaign editor user interface 232 allows the user(s) 240 to interact with the campaign editor 220 in order to setup one or more online advertisement campaigns. The campaign editor user interface 232 may be, for example, a web browser that allows the user 240 to access the campaign editor 220 executed by the campaign manager server 202. Additionally and/or alternatively, the campaign editor user interface 232 may be an application executed by each of the client terminals 201 to allow the user(s) 240 to interact over the internet 250 with the campaign editor 220 executed by the campaign manager server 202.

In some embodiments of the present invention the campaign manager server 202 and/or part thereof is implemented by the client terminal 201 such that the client terminal(s) 201 locally execute the campaign editor 220, the AD space fisher 222, the AD space utilizer 224, the AD space bidder 226, the AD builder 228 and/or the performance monitor 230.

Figure 3:
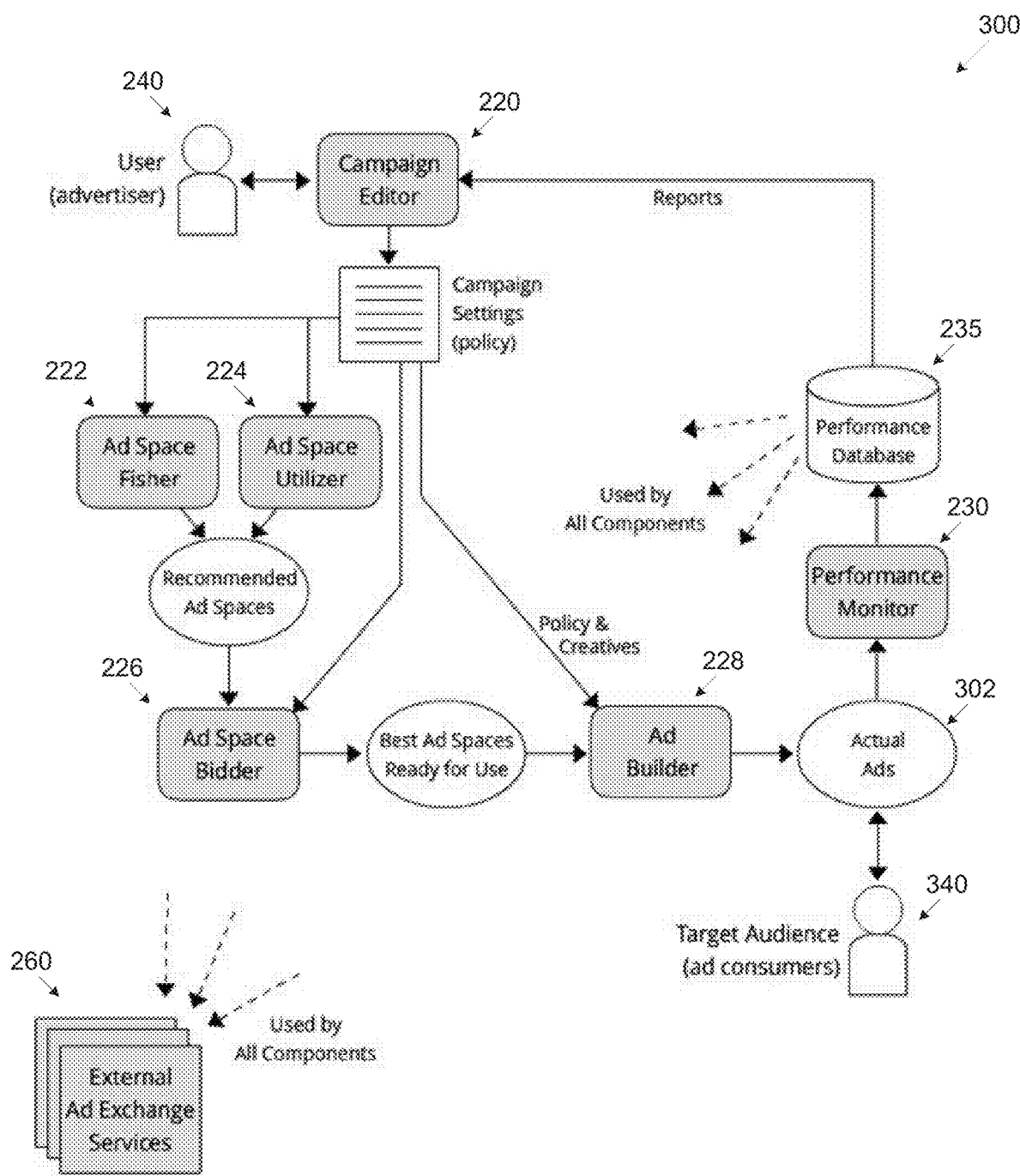
FIG. 3 is a schematic illustration of exemplary software modules for executing an exemplary process for expanding an online advertisement campaign through self-expansion, according to some embodiments of the present invention.

Reference is now made to FIG. 3, which is a schematic illustration of exemplary software modules for executing an exemplary process for expanding an online advertisement campaign through self-expansion, according to some embodiments of the present invention. A process 300 for optimizing an online advertisement campaign is executed using several software modules such as, for example, the campaign editor 220, the AD space fisher 222, the AD space utilizer 224, the AD space bidder 226, the AD builder 228 and/or the performance monitor 230. The process 300 follows the steps of a process such as the process 100 described herein after and provides a visual view of the software modules interaction and flow. The software modules, i.e. the campaign editor 220, the AD space fisher 222, the AD space utilizer 224, the AD space bidder 226, the AD builder 228 and the performance monitor 230 operate in symbiotic collaboration, each employing one or more algorithms to execute its tasks. Each of the software modules may interact with any other module to collect and/or provide data required for their operation. The AD space fisher 222 and the AD space utilizer 224 are responsible for identifying online advertisement spaces that potentially fit the online advertisement campaign. The AD space bidder 226 controls the actual online advertisement spaces purchasing including, selecting, bidding and purchasing the online advertisement spaces. The AD builder 228 is responsible for constructing the actual advertisement(s) 302 posted in the purchased online advertisement space(s) to be exposed to visitors 340, i.e. the advertisement audience (target audience). The campaign editor 220 controls the interaction with the user 240 including collecting data from the other software module(s) and presenting/alerting it to the user 240.

Before further describing the process of expanding the online advertisement campaign, some terms and operational modules are explained and defined.

First, the online campaign management system 200 is capable of concurrently managing multiple online advertisement campaigns. While the process 100 focuses on a specific online advertisement campaign to illustrate clearly the process 100, one or more other online advertisement campaigns may be executed, managed and/or optimized in parallel. The other online advertisement campaigns may be initiated by the same user 240 and/or by one or more other users similar to the user 240.

The process 100 is inherently based on calculating performance of the advertisement 302 posted at the various online advertisement spaces, evaluating the calculated performance and taking action(s) to improve and/or maintain the performance to achieve optimal performance for the overall online advertisement campaign. The performance calculated for each advertisement 302 at a respective one of the online advertisement spaces may be defined as a relation of the conversion count achieved by the advertisement 302 posted at the respective online advertisement space with respect to the cost of the respective online advertisement space. The performance may be calculated and/or measured using an effective cost per action (eCPA) model where the performance is inverse to the eCPA, i.e. the lower the eCPA the better the performance. It should be noted that other models and/or methods may be used for calculating the performance, for example, return on investment (ROI) and/or overall revenue divided by overall cost (ROAS). However, for brevity the eCPA is presented hereinafter. The action by which the effectiveness is measured (conversion) may include for example, a like, an impression, a click and/or a purchase.

The performance score may be calculated for each posted advertisement 302 with respect to one or more aspects of the advertisement 302, for example, characteristics(s) of the online advertisement space(s) hosting the advertisement 302, creative element(s) used for the advertisement 302, characteristic(s) of the visitors 340 and/or the like. The performance of the advertisement 302 may be measured by, for example, an average effective cost per action (eCPA) where the action defines a conversion type, for example, a purchase, a click, an impression, a view, an add-to-cart and/or the like performed by the visitor(s) 340.

The performance of the advertisements may be provided by the performance monitor 230. The performance monitor 230 calculates a performance score for each of advertisements 302, specifically with respect to the online advertisement spaces that are used and/or previously used during any on-going online advertisement campaign. The performance monitor 230 may further refine the performance score of each of the online advertisement spaces by calculating the performance score with respect to one or more contexts of the online advertisement campaign. The contexts may be defined by policy setting(s) defined by the user 240 for the online advertisement campaigns. The contexts may also be dictated by one or more attributes relating to the online advertisement spaces, for example, a category of the website and/or traffic at the website hosting the online advertisement space, the platform type (e.g. website and/or mobile device), the time of day, creative elements used for the advertisement 302 and/or the like. For example, a certain online advertisement space may present high performance, i.e. low eCPA for an advertisement 302 for sports apparel while the same online advertisement space may present poor performance (high eCPA) for an advertisement 302 for airways flights.

As another example, a certain online advertisement space may present high performance for an advertisement 302 targeting audience under 20 years old while the same online advertisement space may present poor performance for an advertisement 302 targeting audience over 40 years old. The performance monitor 230 may store the performance scores for the used online advertisement spaces in a performance database such as the performance database 235. The performance monitor 230 stores the performance metadata of each advertisement(s) 302 posted at each of the one or more online advertisement spaces including, for example, the used online advertisement space(s), the used creative(s), the geographical location, a domain, a platform and the like.

The performance monitor 230 may further aggregate the collected performance data of the online advertisement spaces according to an implementation of the system and/or according to one or more characteristics (settings) of the online advertisement spaces, for example, a platform, the visitors 340, content, time span, advertisement type, used creative(s) and/or the like. For example, the performance monitor 230 may aggregate the performance data over a time span, for example, hours, days, weeks, etc. As another example, the performance monitor 230 may aggregate the performance data according to platform type, for example, mobile devices, web browsers and/or the like. Yet another example for aggregating the performance data may be according to geographical location of the visitors 340 exposed to the advertisement posted at the online advertisement spaces. Aggregating the performance data may provide big data analytics that may be used by one or more of the other software modules.

The aggregated performance data may also be presented to the user 240, for example, for extended time span analysis. The aggregated data may serve to reduce the size of the collected performance data that may amount to huge quantities while providing a wide view of the online advertisement spaces performance behavior. The aggregated data may also serve to reduce the performance computation time since the computation may rely on performance data previously collected and going through extensive quantities of performance data stored for each individual advertisement 302 may lead to excessive processing time and/or high computation load. The performance monitor 230 may aggregate the performance data differently for different online advertisement campaigns according to specific user definitions applied by the user 240 and/or according to objective(s) derived from a policy and/or setting(s) of the online advertisement campaign.

A major concept of the automatically expanding online advertisement campaign optimization relates to maintaining a global pool of available online advertisement spaces that may be added to a campaign pool containing online advertisement spaces used for the (current) online advertisement campaign. The global pool includes a plurality of online advertisement spaces that are currently used by on-going online advertisement campaign(s) and/or by previous online advertisement campaign(s). The global pool may be coupled with the performance database 235 such that each of the online advertisement spaces is associated with performance data relating to one or more advertisements 302 posted at each of the online advertisement spaces. The global pool is continuously analyzed by the AD space utilizer 224 to enhance utilization of the online advertisement spaces for the (current) online advertisement campaign while the AD space fisher 222 continuously explores the internet 250 to communicate with one or more AD exchanges 260 to identify new online advertisement spaces that may be added to the global pool.

The AD space fisher 222 may search for new advertisement spaces for both a specific online advertisement campaign and/or for a wider cross-campaign perspective. The new online advertisement spaces may be used to construct an initial campaign pool of online advertisement spaces for a new online advertisement campaign and/or the AD space fisher 222 may be used to refresh/expand the existing global pool of the available online advertisement spaces for active online advertisement campaign(s).

The AD space fisher 222 may further employ one or more learning mechanisms and/or algorithms that identify one or more similarity patterns shared between the new online advertisement spaces and online advertisement spaces that are currently used and/or previously used during the online advertisement campaign. The AD space fisher 222 may obtain one or more characteristics of the new online advertisement spaces by communicating with the one or more AD exchanges offering the new online advertisement spaces using the API provided by each of the AD exchanges. By comparing the characteristic(s) of the new online advertisement spaces and the characteristic(s) of the used online advertisement spaces, the AD space fisher 222 may identify the shared similarity pattern(s). The characteristic(s) may include, for example, traffic segmentation (e.g. age, gender and/or the like), traffic volume, geographical location, category (e.g. news, finance, fashion and/or the like), platform (e.g. websites, mobile applications) and/or the like.

The AD space fisher 222 may use performance history available from the performance database 235 that comprises the performance scores of high performing used online advertisement spaces to identify which of the new online advertisement spaces is potentially a high performance online advertisement space for the online advertisement campaign. The AD space fisher 222 may analyze the new online advertisement spaces based on similarity analysis with, for example:

- Online advertisement spaces currently used and/or previously used that present high performance for the online advertisement campaign.
- Online advertisement spaces used for previous online advertisement campaign(s) of the user 240 that present high performance.
- Online advertisement spaces used for on-going and/or previous online advertisement campaign(s) of other users (cross-campaign) that present high performance.

For example, the AD space fisher 222 may choose the new online advertisement spaces that presented high performance during previous online advertisement campaigns directed to the same target market. As another example, the AD space fisher 222 may add new online advertisement spaces by identifying a category of the item(s) offered by the online advertisement campaign. For example, for a children fashion online advertisement campaign, the AD space fisher 222 may add one or more new online advertisement spaces that presented high performance during previous children fashion campaigns.

The AD space fisher 222 may employ one or more semantic analysis tools to create a similarity keyword vector for each user 240 and/or for each of the user 240 online advertisement campaigns. The keywords included in the similarity keyword vector may be manually configured by the user 240 using the campaign editor user interface 232 during campaign editing and/or setup. Additionally and/or alternatively, the AD space fisher 222 creates automatically the similarity keyword vector by extracting keywords from materials of the user 240, for example, a website, a competitor's website, marketing material and/or the like. The keywords may be extracted by, for example, analyzing metadata available in the materials of the user 240 and/or by one or more keyword extraction algorithms, for example, rapid automatic keyword extraction (RAKE) and/or key-phrase extraction algorithm (KEA). In a similar manner, the AD space fisher 222 creates a similarity keyword vector for each new online advertisement space wherever applicable, for example, a website online advertisement space.

The AD space fisher 222 applies a correlation score (vector distance) for each of the new online advertisement spaces with respect to the user 240 to detect potential matching between each of the new online advertisement spaces and the online advertisement campaign of the user 240. During the online advertisement campaign, the AD space fisher 222 may create the correlation vector for the new online advertisement spaces with respect to online advertisement spaces that are used for the online advertisement campaign and present high performance.

Optionally, the AD space fisher 222 identifies the new online advertisement spaces using $3^{rd}$ party traffic analyzers such as, for example, Alexa that provide similarity scores between websites. The AD space fisher may communicate with the $3^{rd}$ party traffic analyzers through an API provided by each of the $3^{rd}$ party traffic analyzers. The AD space fisher 222 may search for web sites that are indicated by the $3^{rd}$ party traffic analyzers as similar to the website of the user 240 and/or to website(s) of one or more competitors of the user 240. The AD space fisher 222 take advantage of general websites presenting high traffic that offer online advertisement spaces for the new online advertisement spaces. The AD space fisher 222 may apply the similarity keyword vector to each of the new online advertisement spaces to evaluate their suitability for the online advertisement campaign.

Optionally, the AD space fisher 222 identifies the new online advertisement spaces using $3^{rd}$ party services that provide list(s) of online advertisement spaces that are used by competitors of the user 240. The online advertisement spaces used by the competitors, specifically, online advertisement spaces that are frequently and/or intensively used by the competitors may present high performance scores for the online advertisement campaign of the user 240.

Optionally, the AD space fisher 222 randomly adds new online advertisement spaces to the campaign pool of online advertisement spaces. The AD space fisher 222 applies a random chaos factor, i.e. select the random new online advertisement spaces from the entire space universe of available online advertisement spaces to avoid fixation of the online advertisement campaign on a small group of online advertisement spaces. The randomly selected new online advertisement spaces may allow detecting random lucrative online advertisement spaces opportunities.

Optionally, the AD space fisher 222 adds to the campaign pool dropped online advertisement spaces once used for one or more past online advertisement campaigns and dropped for one or more reasons from the global pool. The reason(s) for dropping the dropped online advertisement spaces may be, for example, websites offering the dropped online advertisement spaces that went offline and came back online, poor performing dropped online advertisement spaces to receive a another chance and/or the like.

The AD space utilizer 224 periodically analyzes the performance of the online advertisement spaces that are already available in the global pool. The AD space utilizer 224 analyzes the available online advertisement spaces to estimate and/or predict their performance with respect to the online advertisement campaign in order to improve the utilization of the available online advertisement spaces for the (current) online advertisement campaign.

The AD space utilizer 224 may employ one or more learning mechanisms and/or algorithms similar to those of the AD space fisher 222 to identify one or more similarity patterns shared between available online advertisement spaces not previously used for the (current) online advertisement campaign and online advertisement spaces currently and/or previously used for the online advertisement campaign. The AD space utilizer 224 may use the performance data from the performance database 235 to analyze and/or predict the performance of the not previously used online advertisement spaces based on their similarity to one or more of the used online advertisement spaces. The AD space utilizer 224 may use the history performance scores of high performing used online advertisement spaces to identify which of the not previously used advertisement spaces may potentially present high performance for the (current) online advertisement campaign.

The AD space utilizer 224 may analyze the global pool of the available online advertisement spaces to divide the pool to a plurality of clusters of available online advertisement spaces that share one or more of the similarity patterns based on past behavior of the available online advertisement spaces. The AD space utilizer 224 may use one or more clustering methods to create the clusters, for example, k-means. Optionally, the AD space utilizer 224 divides the available online advertisement spaces using several clustering schemes each based on different similarity pattern(s) and/or clustering criterion(s).

For example, the AD space utilizer 224 may cluster the available online advertisement spaces based on their performance score with respect to target category(s) (e.g. sports, news fashion, finance and/or the like) of the available online advertisement spaces such that available online advertisement spaces that perform similarly for similar target category(s) are grouped together. Another clustering scheme may be based on traffic segmentation characteristics of the available online advertisement spaces such that available online advertisement spaces that present similar performance scores for the same traffic segment (e.g. age, gender, geographic locations and/or the like) are grouped together. The AD space utilizer 224 may use one or more of the clustering schemes as appropriate for predicting and/or estimating performance of the not previously used online advertisement spaces. When predicting performance of one or more not previously used online advertisement spaces, it is likely that used online advertisement spaces of the same cluster as one or more used online advertisement spaces may present similar performance.

The AD space utilizer 224 employing, for example, the k-means clustering algorithm may require three inputs to execute the clustering:

A score vector for each of the available online advertisement spaces. The score vector may include one or more performance indicators, for example, the eCPA. The score vector may include multiple score fields (eCPA) each assigned to the respective available online advertisement space with respect to different contexts, i.e. different online advertisement campaign's characteristics, for example, targeting group(s), market segment(s), geographic location(s), platform(s) and/or the like. In case the respective available online advertisement space was never used for specific one or more online advertisement campaigns having the respective characteristic(s) the associated score field is assigned a not applicable value, for example, "−1". The score vector of three exemplary online advertisement spaces may look as presented in the following table:

| Online Advertisement Campaign Characteristic | Online Advertisement Space 1 | Online Advertisement Space 2 | Online Advertisement Space 3 |
|---|---|---|---|
| Online Advertisement Campaign I (Sports Wear) | 0.2 | 0.21 | 2.1 |
| Online Advertisement Campaign II (Advertiser 1) | 0.7 | 0.66 | −1 |
| Online Advertisement Campaign (Advertiser 2) | 1.2 | −1 | 0.1 |
| Desktop Devices | 2.1 | 1.8 | 1.0 |
| Mobile Devices | 1.4 | −1 | −1 |
| U.S. | 0.8 | 0.88 | −1 |
| Canada | −1 | 0.72 | 2.4 |

As shown, the online advertisement campaign characteristics presented in the example above include campaign market segment, campaign advertiser i.e. user 240, platform, geographical location, etc.

As evident from the Online Advertisement Space 1 and the Online Advertisement Space 2 share similar performance scores (eCPA) for the respective online advertisement campaign characteristics meaning the Online Advertisement Space 1 and the Online Advertisement Space 2 may be of the same cluster while the Online Advertisement Space 3 has very different score values for the presented characteristics.

A vector distance function that calculates the distance between score vectors of two online advertisement spaces by calculating the difference between every two respective score fields in the score vectors. The vector distance function may be adjusted with one or more parameters, for example, if the two online advertisement spaces share less than a pre-defined number of score fields the vector distance function may set the distance to ∞. The vector distance function only operates on score fields that do not contain not applicable values.

A number of desired clusters that may be determined by an adjustable parameter defining the required cluster size. If the required cluster size is not reached, sub-clustering processes may be applied to further divide the clusters.

Applying the clustering algorithm(s) a plurality of clusters are created for each context. Every two available online advertisement spaces may be estimated as similar and hence grouped together in the same cluster in case they both present similar performance score for a specific context. The clustering may identify available online advertisement spaces that present high performance or poor performance for the specific context.

The AD space utilizer 224 may perform the clustering periodically during the online advertisement campaign to identify available online advertisement spaces that are predicted to present the highest performance for the online advertisement campaign based on the performance of the used online advertisement spaces of the same cluster. The AD space utilizer 224 may be set through one or more parameters to adjust the performance prediction and selection of the available online advertisement spaces for use for the current online advertisement campaign. The adjustable parameters may include, for example, a number of top performing used online advertisement spaces, a maximum past time (T) each of the used online advertisement space was used and/or a number of top performing candidate online advertisement spaces.

The AD space utilizer 224 may apply one or more activation rules to each of the available online advertisement spaces to further optimize the use of the available online advertisement spaces. The activation rules may specify one or more criteria for activating or deactivating each of the available online advertisement spaces. Some available online advertisement spaces present high performance during daytime, for example, while presenting significantly lower performance during nighttime. Other scenarios of varying performance may include, for example, weekend, holiday, geographic location, platform and/or the like. As another example, a specific available online advertisement space may present high performance score used at websites adapted for desktop web browser use while the same available online advertisement space may present low performance score at the same websites adapted for mobile devices use. The Ad space utilizer 224 may hold a list of the criteria with predefined values, for example, time(s) of day, time(s) of week, platform, country, etc. the AD space utilizer 224 may constantly check the performance of the online advertisement spaces to identify one or more patterns in the performance data of each of the available online advertisement spaces.

The AD space utilizer 224 may then assign an appropriate activation rule to handle the detected performance pattern. For example, a specific available online advertisement spaces that presented low performance score during the week while presenting high performance score during the weekend may be assigned with an activation rule to indicate it should be disabled during the week and enabled during the weekend. Assigning the activation rules may prevent filtering out online advertisement spaces that present a relatively low average performance score while in fact they may present high performance score during some peak time, location, platform and/or the like. One or more of the activation rules may later be used by the AD space bidder 226 for fine-tuning the bidding for the candidate online advertisement space(s) offered by the AD space utilizer 224.

Both the AD space fisher 222 and/or the AD space utilizer 224 avoid offering "bulks" comprising multiple online advertisement spaces and rather focus on individual online advertisement spaces. By selecting the candidate online advertisement spaces individually scenarios may be avoided in which a "bulk" of online advertisement spaces seems to perform well while in fact only some of the online advertisement spaces present high performance and other online advertisement spaces of the "bulk" perform poorly. The average performance score of the "bulk" may therefore be misleading. By selecting the candidate online advertisement spaces individually, only the high performing online advertisement may be selected while dropping the poorly performing online advertisement spaces thus maximizing the utilization of the candidate online advertisement spaces.

Reference is made once again to FIG. 1. First, as shown at 102, the process 100 starts with the campaign editor 220 interacting with an advertiser (user) 240 using the client terminal 201 executing the campaign editor user interface 232. The campaign editor 220 receives from the user 240 an advertisement policy for one or more online advertisement campaigns.

The campaign editor 220 allows the user 240 to create a policy for the online advertisement campaign(s) by defining one or more policy settings. The policy settings may include, for example, a campaign name, one or more creative files, a general scope of the online advertisement campaign, a budget, a target market restriction, a bidding model, desired visitor (a person that is exposed to the advertised content) action and/or a goal of the online advertisement campaign. The campaign editor 220 may significantly reduce the complexity and/or ease the process of setting up the online advertisement campaign that may sometimes be tiresome for the user 240 who directly approaches one or more AD (advertisement) exchanges that offer online advertisement spaces for posting advertisements. While the various AD exchanges may present different interfaces for setting up the online advertisement campaign, the campaign editor 220 may direct the user 240 to provide a limited set of basic settings. The campaign editor 220 may communicate with the Ad exchange(s) using an application programming interface (API) provided by each of the AD exchanges.

The campaign editor 220 may adjust the basic settings in order to fit them for the various AD exchanges. For example, some AD exchanges may enable the user to target a specific web browser while other AD exchanges may not, some AD exchanges offer sophisticated pricing models while other AD exchanges may not, etc. Moreover, different AD exchanges may differently designate and/or refer to the settings required from the user 240, for example, language settings may apply to user and/or operating system (OS), bid prices may be set globally as a fixed value or separately as a price-range-per-target, etc. Grouping and managing multiple campaigns may also differ among the various AD exchanges, for example, one AD exchange may enable grouping of campaigns and defining "sub" campaigns while other Ad exchanges may not. And so on—hundreds of ad exchanges exist, each with its own unique interface. The campaign editor 220 may further use the basic settings and/or previously used settings to generate automatically additional settings required by the AD exchange(s).

The user 240 may define one or more creative elements that may be used to create one or more advertisements used during the online advertisements campaign. The creative elements may include, for example, a picture, a video clip, a text, a symbol, a logo, an audio playback and/or the like. The creative elements may be provided by the user 240 through one or more creative files. The user 240 may further use the campaign editor 220 to create, edit, combine and/or manipulate the creative element(s).

The user 240 may define the online advertisement campaign policy through one or more policy settings, including for example, a general scope of the online advertisement campaign target and/or one or more restrictions for defining the online advertisement campaign target(s), for example, target audience characteristic(s), technical configuration, content category(s) and/or the like. The target audience policy characteristic(s) may define, for example, age, gender, geographical location, demographic profile, income level, brand loyalty level and/or the like. The technical configuration policy setting(s) may define, for example, platform(s) such as, for example, a mobile application and/or a website. The content policy setting(s) may define, for example, category(s) of domain(s) and/or application content such as, for example, news, finance, sports, games, fashion and/or the like.

The budget may be defined in one or more approaches, for example, an overall budget for the online advertisement campaign, a periodic budget (daily, weekly, monthly and the like) and/or a flexible budget that changes depending on performance of the online advertisement campaign.

The bidding strategy may be defined to base on one or more models, for example, cost per impression (CPM) and/or cost per click (CPC). The bidding strategy is typically selected, adjusted and/or adapted automatically by the AD space bidder 226, however it may be possible for the user 240 to define one or more bid rules to set general bidding guidelines, for example, follow a conservative bidding approach and/or apply an aggressive bidding approach for exceptionally high performing online advertisement spaces.

The user 240 may define the desired action of the visitor 340 in response to accessing the advertised content, for example, visit a website, register, install an application and/or the like.

The user 240 may specify the goal for the online advertisement campaign, for example, a maximum effective cost per action (eCPA). The action by which the effectiveness is measured (conversion), for example, a like, an impression, a click and/or a purchase may be defined by the user 240 through one or more policy settings. The goal of the online advertisement campaign may present the overall goal the user 240 tries to achieve by the online advertisement campaign. The goal is typically expressed as one or more monetary goals and/or constraints. For example, the goal may define a maximum conversion price, i.e. how much is the user 240 willing to pay for each conversion. As an example, assuming the online advertisement campaign is directed at selling one or more items, the conversion may be defined as an actual purchase and the goal may define the maximum advertisement expenses the user 240 is willing to spend per conversion. As another example, assuming the online advertisement campaign is directed at awareness and/or branding, the conversion may be defined as a click and the goal may define the maximum price per click. The goal may be defined by other measurable parameters, for example, ROAS. For example, the goal may be set to reach revenues that are 30% higher than the cost of the online advertisement campaign. The goal may define the internal workings and operational modes of the various algorithms and methods employed by the process 100. For example, as presented hereinafter, the AD bidder 226 bases the bid price(s) on the goal(s) of the online advertisement campaign.

The user 240 may provide additional information to the campaign editor 220, for example, a domain name of the domain of the user 240. The additional information may further include keywords relating to the user 240, the online advertisement campaign and/or the offered item presented by the online advertisement campaign. The additional information may also include information on one or more competitor of the user 240 and/or other criteria. The additional information may later be used by one or more of the software modules for optimizing the performance of the online advertisement campaign.

The campaign editor 220 may setup the overall online advertisement campaign. The campaign editor 220 may define one or more objectives for the online advertisement campaign, for example, the scope, intensity, the market category(s), the target audience, the platform(s) and/or the like. The campaign editor 220 may define the objective(s) with respect to one or more constraint(s) (policy settings) indicated by the user 240, for example, the budget, campaign time duration, geographical location and/or the like. The campaign editor 220 may further define the mean(s) for achieving the online advertisement campaign goal, for example, creative elements, platform(s) exposure strategy, bidding strategy and/or the like. Some of the means may be either defined by the user 240 as the campaign policy settings and/or constraints, for example, platform, and geographical location. However, these means may be set automatically by the campaign editor 220 as means to achieve higher-level goal(s) defined by the user 240, for example, campaign exposure level and/or intensity.

Figure 4:
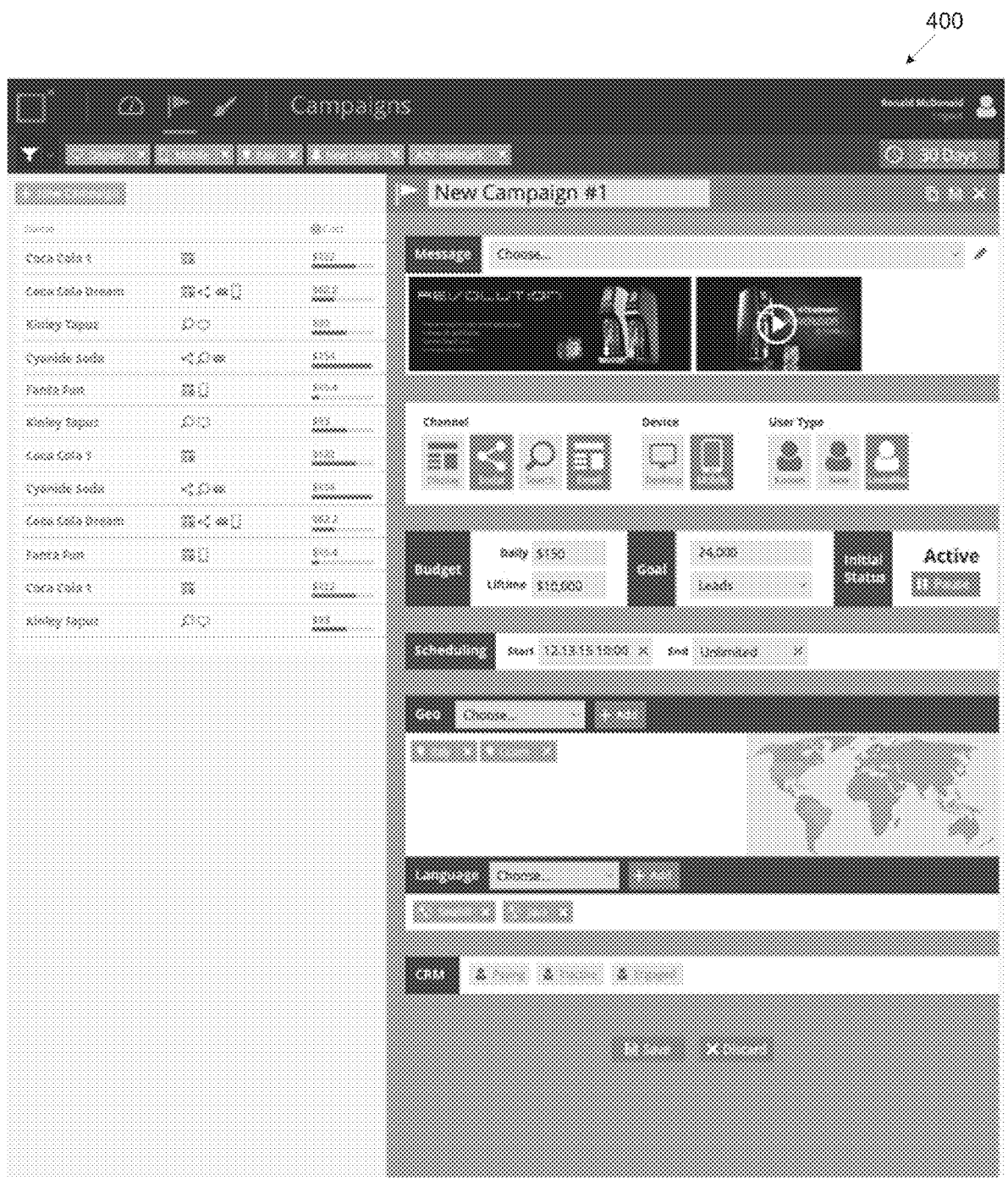
FIG. 4 is a screenshot of an exemplary campaign editor user interface for setting up an online advertisement campaign, according to some embodiments of the present invention.

Reference is now made to FIG. 4, which is a screenshot of an exemplary campaign editor user interface for setting up an online advertisement campaign, according to some embodiments of the present invention. A screenshot 400 presents an exemplary campaign editor user interface such as the campaign editor user interface 232. The screenshot 400 may be presented to a user such as the user 240 by a user interface such as the campaign editor user interface 232. In case the campaign editor user interface 232 is a web browser executed by a client terminal such as the client terminal 201 of the user 240, the screenshot 400 may be generated by a campaign editor such as the campaign editor 220 and presented to the user 240 through a GUI of the web browser. In case the campaign editor user interface 232 is an application executed by the client terminal 201, the screenshot 400 may be generated by the campaign editor user interface 232 according to instructions by the campaign editor 220 and presented to the user 240 through a GUI of the campaign editor user interface 232 application. As shown in the screenshot 400, the user 240 is presented with a GUI allowing the user 240 to define one or more of the online campaign policy settings, for example, campaign name, scope, budget, target audience, target platform, target geographic location(s), language(s), analytics generation, bidding rules, campaign goal, creative element(s) settings, visitor actions and/or the like. The user 240 may use the campaign editor user interface 232 to setup, manage, monitor and/or retrieve information of multiple online advertisement campaigns either on-going and/or previous.

Reference is made once again to FIG. 1. As shown at 104, after setting up the campaign, a test group of candidate online advertisement spaces is created. The test group may be created by the AD space bidder 226 selecting one or more candidate online advertisement spaces from the campaign pool. The candidate online advertisement spaces selected by AD space bidder 226 for evaluation and/or testing may be used online advertisement spaces previously used during the online advertisement campaign and for which the performance score is known. However, the AD space bidder 226 may select one or more candidate online advertisement spaces offered by the AD space fisher 222 and/or the AD space utilizer 224. The AD space bidder 226 may select the candidate online advertisement space(s) according to an analysis of performance of the online advertisement spaces with respect to the online advertisement campaign policy and/or one or more of the policy settings. The AD space bidder 226 may base its performance analysis on performance data available from the performance database 235, on predicted performance provided by the AD space utilizer 224 and/or by testing performance of new online advertisement spaces offered by the AD space fisher 222. The number of candidate online advertisement spaces the AD space bidder 226 selects for the test group may be adjusted to meet the budget constraint(s) of the online advertisement campaign and, more specifically, the budget constraint(s) applied on the testing phase of the candidate online advertisement space.

The AD space bidder 226 may select the candidate online advertisement spaces offered by the AD space fisher 222 and/or the AD space utilizer 224 based on one or more adjustable parameters. The Adjustable parameters may include, for example, a required number of large-scale online advertisement spaces, a number of allowed new online advertisement spaces and/or a weight for distributing the candidate new online advertisement spaces according to the method used by the AD space fisher 222 to select candidate new online advertisement spaces. For example, in case there is a need for 50 candidate online advertisement spaces and only 30 of them are allowed to be new online advertisement spaces, the AD space bidder 226 may select 30 new online advertisement spaces offered by the AD space fisher 222 and 20 available online advertisement spaces to form the AD space utilizer 224. The 30 candidate new online advertisement spaces may be selected such that for example, 20% are selected based on the similarity keyword vector, 10% are selected based on the $3^{rd}$ party(s) services, 50% are selected based on the performance score and 20% are selected from the random new online advertisement spaces.

As shown at 106, the AD space bidder 226 places bids to purchase the one or more candidate online advertisement spaces. The AD space bidder 226 uses the API provided by the AD exchange(s) to interact with the AD exchange(s) for bidding for the candidate advertisement space(s). The AD space bidder 226 employs a small-scale advertisement strategy for the candidate online advertisement space(s) in order to test and characterize their performance before using them for large-scale advertisement session(s). The AD space bidder 226 may allocate a predefined amount of the budget of the online advertisement campaign to evaluate the performance of the candidate online advertisement space(s). The amount of the budget may be set through one or more adjustable parameters, for example, a percentage of the overall budget, a percentage of a daily budget and/or the like.

The AD space bidder 226 may optimize a bid price(s) for each of the candidate online advertisement spaces. The AD space bidder 226 may adjust the bid price such that the candidate online advertisement space(s) is used sufficiently to characterize it performance and calculate a performance score for it. Sufficiently used refers to a level of exposure an advertisement receives at the candidate online advertisement space, for example, a number of impressions, a number of clicks and/or the like. The level of exposure may be set through one or more adjustable parameters, for example, a minimum number of impressions, a minimum number of clicks and/or the like.

The AD space bidder 226 may initiate the bidding process by setting a fixed low bid price for the candidate online advertisement space(s), for example, $0.01. The AD space bidder 226 periodically checks the exposure level, for example, the number of resulting impressions and adjusts the bid price accordingly until the exposure level it reaches a desired level sufficient for calculating a performance score for the candidate online advertisement space(s). The AD space bidder 226 may gradually increase the bid price exponentially until a predefined minimum exposure level is achieved and then the AD space bidder 226 may adjust the bid price according to a desired increase in the exposure level, for example, impressions count. The AD space bidder 226 may use for example, a strategy formulated as:

$$New\_Price = (Desired\_Impressions\_Count / Actual\_Impressions\_Count) \cdot Old\_Price$$

Since the budget for the candidate online advertisement spaces may be limited, the Ad space bidder 226 may abort the bidding process in case the budget for the candidate online advertisement spaces is exhausted. The Ad space bidder 226 may manage the bidding process according to one or more strategies, for example, a daily budget and/or a pacing strategy in which the daily budget is divided to smaller budget-per-hour portions, then pausing the bidding whenever the hourly budget is exhausted. In case the bidding process is aborted and/or halted the AD space bidder 226 may reduce the number of the candidate online advertisement spaces, for example, by 10% in order to allow sufficient exposure for the remaining candidate online advertisement spaces while meeting the testing budget constraint(s).

The AD space bidder 226 may apply one or more of the activation rule(s) defined by the AD space utilizer 224 to increase the utilization, i.e. the performance of the candidate online advertisement space(s) by bidding for use of the candidate online advertisement space(s) at their peak conditions as defined by the activation rule(s).

This may be of particular significance in case the candidate online advertisement space presents poor performance during the test phase. The performance analysis of the candidate online advertisement space may be repeated by the performance monitor 230 to evaluate its performance within the restriction(s) of the activation rule(s).

As shown at 108, the AD builder 228 creates an advertisement to post at each of the purchased candidate online advertisement space(s). The AD builder 228 may create the advertisement using one or more creative elements defined by the user 240 during the online advertisement campaign setup. The AD builder 228 may select the creative element(s) to fit one or more characteristics of the purchased candidate online advertisement space(s) and/or of the website hosting the purchased candidate online advertisement space(s), for example, fit a picture(s), select a language, place a video clip(s), use a logo and/or the like. The AD builder 228 may initially select the creative element(s) randomly from the available creative elements provided by the user 240. However, the AD builder 228 may later refine the selection of the creative element(s) based on the performance achieved by the purchased candidate online advertisement space(s). The AD builder 228 may assign a weighted eCPA for each of the creative elements with respect to candidate online advertisement space. The probability to choose a specific creative may be adjusted to be:

$$P = (1 - eCPA) / (\text{Sum of all } (1 - eCPA) \text{ values for all creative elements candidates})$$

This formulation may ensure that high performing creative elements (presenting low eCPA) will be used more frequently than creative elements that present low performance. For example, a specific purchased candidate online advertisement space is hosted by a Japanese website. The AD builder 228 may initially select the advertisement text language (considered a creative element) to be English for example, for 50% of the time and Japanese for 50% of the time. After sufficient exposure is achieved for the purchased candidate online advertisement space, the performance score may be calculated for the advertisement with the two different languages (creative elements). Assuming the Japanese creative element presents better performance, using the above formulation results in converging to the Japanese creative element used for the candidate online advertisement space.

As shown at 110, the performance monitor 230 analyzes the performance of the purchased candidate online advertisement space(s) and calculates the performance score. The performance monitor 230 continuously collects and stores in the performance database 235 performance data of each of the advertisements 302 posted at each purchased candidate online advertisement spaces as well as all other purchased online advertisement spaces across all on-going online advertisement campaigns. The performance data may include one or more metrics, for example, price, impressions, clicks, revenue (when available) and/or various conversion types. The conversion type may be adjusted according to the online advertisement campaign policy setting(s)

and/or according to the user 240, for example, purchases, web page views, add-to-cart actions, app downloads, etc. The performance monitor 230 may use one or more methods to collect the performance data of the purchased online advertisement spaces, for example, a conversion pixel, an AD exchange service report, a dedicated data-collection client agent with a matching server API and/or the like.

Based on the performance data, the performance monitor 230 calculates the performance score for each of the purchased online advertisement spaces. The performance score may be expressed as eCPA, but other one or more metrics may be used, for example, ROI. The performance monitor 230 may also base the calculation of the performance score on several conversion types, for example, purchases, add-to-cart operations, clicks, impressions, views and/or the like. An exemplary performance score calculated by the performance monitor 230 may be formulated in the following formula:

$$Score=Cost/(0.4 \cdot Purchases+0.25 \cdot `Add\text{-}To\text{-}Cart's+0.35 \cdot Page\text{-}Views).$$

As shown at 112, which is a decision point, the performance of each of the candidate online advertisement spaces is evaluated against one or more predefined performance criteria. The performance criteria may include, for example, an absolute performance score defined by the online advertisement campaign policy setting(s), a relative performance score compared to one or more large-scale online advertisement spaces and/or the like. For example, in case the eCPA of a specific candidate online advertisement space is lower than an adjustable predefined parameter, for example, 120% of the goal of the online advertisement campaign (the lower the eCPA the better) the performance monitor 230 may indicate the candidate online advertisement space as presenting high performance. In case the performance score of the candidate online advertisement space(s) exceeds the performance criteria the process 100 branches to 114, otherwise the process 100 branches to 116.

As shown at 114 in case the performance score of the candidate online advertisement space exceeds the performance criteria, the AD space bidder 226 moves the candidate online advertisement space to an execution group comprising one or more large-scale online advertisement spaces. The performance criteria may be dynamic such that it may be automatically adjusted to handle various conditions. For example, while the execution group is empty and/or includes relatively few large-scale advertisement spaces, the performance criteria may be relaxed to allow the candidate online advertisement space(s) to be moved to the execution group even if the candidate online advertisement space(s) are not very high performing. However once the execution group is full, the performance criteria may be adjusted such that the candidate online advertisement space(s) may be added to the execution group only if it outperforms the lowest performing large-scale online advertisement space. The amount of the large-scale advertisement spaces in the execution group may be an adjustable predefined parameter, for example, a number of large-scale advertisement spaces and/or an overall budget for the large-scale advertisement spaces. In case the candidate online advertisement space(s) outperforms one or more of the large-scale online advertisement spaces, the lowest performing large-scale online advertisement space(s) is replaced with the candidate online advertisement space(s).

As shown at 116, the AD space bidder 226 bids to purchase the large-scale online advertisement spaces included in the execution group. The Ad space bidder 226 sets the bid price for the large-scale online advertisement space(s) based on their performance as calculated by the performance monitor 230. The performance monitor 230 may calculate the performance score such as the eCPA, and more specifically a weighted eCPA periodically, for example, once a day. The weighted eCPA encapsulates the full performance history of each large-scale online advertisement space while giving a higher weight to recent performance, for example, as formulated in the following formula:

$$New\_Weighted\_eCPA=\alpha \cdot (Current\_eCPA)+(1-\alpha) \cdot (Previous\_Weighted\_eCPA)$$

Where $\alpha$ is a dynamics factor that determines the intensity of bid price change, for example, 0.25.

The AD space bidder 226 may adjust the bid price for each large-scale online advertisement space by the difference between the eCPA and the goal of the online advertisement campaign, for example, as formulated in the following formula:

$$New\_Bid\_Price=(Weighted\_eCPA/Goal) \cdot Previous\_Bid\_Price.$$

The AD space bidder 226 may continuously and/or periodically adjust the individual bid prices for each of the large-scale online advertisement spaces to maximize their performance.

The AD space bidder 226 may learn the behavior of each large-scale online advertisement space to ensure that high performing large-scale online advertisement spaces whose performance outreaches the goal of the online advertisement campaign are bid using higher bid prices thus increasing the volume of bid winnings and their overall traffic. Similarly, low performing large-scale online advertisement spaces are decreased in their winning bids that is naturally followed by decreased traffic volume. The AD space bidder 226 constantly adjusts the bid prices accordingly. The adjustment process of the AD space bidder 226 may be limited by the maximal market price, for example, if over 90% of the bids are won the AD space bidder 226 does not increase the bid price.

Similarly to what is done for the candidate online advertisement spaces of the test group during testing, the AD space bidder 226 may abort the bidding process once the budget of the online advertisement campaign allocated for the large-scale online advertisement spaces is exhausted. Naturally, the allocated budget for the large-scale online advertisement spaces is the larger part of the overall budget of the online advertisement campaign as the large-scale online advertisement spaces are those providing the majority of the conversions. In case the bidding process is aborted and/or halted the AD space bidder 226 may reduce the number of the large-scale online advertisement spaces in the execution group, for example, by 10% by dropping the lowest performing large-scale online advertisement spaces. This may allow focusing on the highest performing large-scale online advertisement spaces. In case the allocated budget is not fully utilized, the AD space bidder 226 may increase the number of large-scale online advertisement spaces in the execution group, for example, by adjusting the performance criteria to allow one or more candidate online advertisement spaces to be added to the execution group.

The AD space bidder 226 may constantly adjust the number of large-scale online advertisement spaces in the execution group to meet the allocated budget constraint(s) and/or to accommodate candidate online advertisement spaces that outperform one or more of the large-scale online advertisement spaces. For example, a large-scale online advertisement space may be dropped from the execution group in case their performance score, for example, the weighted eCPA exceeds a maximum predefined threshold, for example, 1.2β, where β is the goal of the online advertisement campaign. The large-scale online advertisement spaces that are dropped (removed) from the execution group may be marked as used available online advertisement spaces. The used available online advertisement spaces may be used by the AD space utilizer 224 for the clustering and/or prediction of performance of unused available online advertisement spaces that share one or more similarity patterns with the used available online advertisement spaces. Optionally, the AD space bidder 226 may select the marked dropped large-scale online advertisement spaces to evaluate their performance again.

Optionally, as is done for the candidate online advertisement spaces, the advertisement creative element(s) may be adjusted for one or more of the large-scale online advertisement spaces. The AD builder 228 may initially select and/or explore various creative elements during the online advertisement campaign to evaluate their performance improvement or degradation with respect to the large-scale advertisement space(s).

The process 100 may be repeated through a plurality of iterations each comprising the steps 104 through 116 until the online advertisement campaign is finished. During each iteration, the AD space bidder 226 may select new online advertisement space(s) for the test group to evaluate their performance and/or replace one or more of the large-scale online advertisement spaces with candidate advertisement spaces presenting better performance. Moreover, during each iteration, the AD space bidder 226 may instruct the AD builder 228 to update creative element(s) in the advertisement 302 used at the online advertisement space(s), either candidate and/or large-scale to improve performance and/or to explore performance impact. The AD space bidder 226 may select the candidate online advertisement spaces for the test group from online advertisement spaces offered by the AD space fisher 222 and/or the AD space utilizer 224. The AD space fisher 222 and/or the AD space utilizer 224 may be operational, performing their designated tasks during the entire online advertisement campaign and/or as long as the system 200 is operating. The AD space fisher 222 may continuously explore the internet 250 to identify and add new online advertisement spaces to expand the global pool. The AD space utilizer 224 may constantly analyze the available online advertisement spaces in the global pool to enhance utilization of the online advertisement spaces for the (current) online advertisement campaign as well as for other online advertisement campaigns.

The Campaign editor 220 may present the user 240 with status information relating to one or more online advertisement campaigns, segments thereof and/or sub-campaigns. The status information may present one or more aspects of on-going and/or past online advertisement campaigns. The aspects may be viewed for the entire online advertisement campaign(s), for parts thereof and/or to individual online advertisement spaces, both candidate and/or large scale. The aspects may include, for example, exposure level, exposure efficiency (traffic vs. actions), average performance, consumed budget funds, remaining budget funds, performance over time, analytics, distribution and/or segmentation information and/or the like. The status information may include, for example, performance data that may be presented and/or reported to the user 240 in one or more views using, for example, one or more metrics, filter(s) and/or segmentation criterion(s). Of course, other settings may be applied by the user 240 to select the desired view of the performance data using one or more metrics, for example, cost, impressions, clicks, conversions, eCPA, revenue, ROAS. One or more filters may be applied to the presented performance information, for example, channel, AD exchange, domain, creative, online advertisement campaigns, geographic location, exposed viewer type, exposed viewer segment, demographics and/or the like. Breakdown graphs and/or reports may be provided and/or presented to the user 240, for example, a breakdown of a performance metric, for example, cost by, for example, channel, country, online advertisement campaign and/or the like. The campaign editor 220 may present the user 240 with status information, for example, performance information of one or more online advertisement campaigns and/or of sub-campaigns. The campaign editor 220 may present the user 240 with additional analytics, for example, impact of an online advertisement campaign on traffic patterns in, for example, a website and/or a Facebook page of the user 240.

Figure 5:
FIG. 5 is a screenshot of an exemplary campaign editor user interface dashboard presenting status information for an online advertisement campaign, according to some embodiments of the present invention.

Reference is now made to FIG. 5, which is a screenshot of an exemplary campaign editor user interface dashboard presenting status information for an online advertisement campaign, according to some embodiments of the present invention. A screenshot 500 presents a status dashboard of an exemplary campaign editor user interface such as the campaign editor user interface 232. The screenshot 500 is presented to a user such as the user 240 by the campaign editor user interface 232. In case the campaign editor user interface 232 is a web browser executed by a client terminal such as the client terminal 201 of the user 240, the screenshot 500 may be generated by a campaign editor such as the campaign editor 220 and presented to the user 240 through a GUI of the web browser. In case the campaign editor user interface 232 is an application executed by the client terminal 201, the screenshots 500 may be generated by the campaign editor user interface 232 according to instructions by the campaign editor 220 and presented to the user 240 through a GUI of the campaign editor user interface 232 application. The dashboard may present the user 240 with a plurality of information items, for example, performance data. The performance data may be presented in one or more views using, for example, one or more metrics, filter(s) and/or segmentation criterion(s).

For example, as seen in the screenshot 500 graphs presenting several performance metrics, for example, cost with respect to clicks with respect to revenue may be set to view a specific period of time, for example, a month. The graphs may be applied with one or more filters to focus on segments of interest, for example, online advertisement spaces in the "social" channel, for example, Facebook, Twitter, Instagram and/or the like. Additional filter(s) may be applied to the performance data graphs and/or reports, for example, platform to select, for example, only mobile devices, geographical location, to select, for example, only united states, united kingdom and Canada and previous experience to select, for example, only visitors who are already-known to the brand (initiating the online advertisement campaign). Using the campaign editor user interface 232, the user 240 may select the exact view to be presented among the available online advertisement campaigns, metrics and/or filters.

Optionally, the campaign editor 220 initiates one or more alerts to the user 240 in case user intervention is required for managing the online advertisement campaign, for example, increase the budget funds and/or add/replace creative element(s). The alert for increasing the budget funds may be generated in case the online advertisement campaign is generally effective but may be enhanced with additional budget funds and/or by changing one or more budget policy settings, for example, increase the allocated daily budget. The alert for adding/replacing one or more creative elements may be initiated to suggest replacing creative element(s) that are estimated as ineffective with respect to other creative element(s) and/or with respect to market standard creative elements. The alert for adding/replacing one or more creative elements may be initiated to indicate potential creative fatigue of one or more of the creative elements, where the creative element(s) that performed well in the past are now wearing out and their performance is declining. In addition, the campaign editor 220 may generate an alert to the user 240 in case direct deal opportunity(s) for the online advertisement space(s) is identified. The direct deal related to the option to bypass the AD exchange(s) for bidding for one or more high performing online advertisement spaces and negotiate for the price of the online advertisement spaces directly with the platform owner and/or operator, for example, a website owner, a mobile application developer and/or the like. The campaign editor 220 may further generate the alert in case the goal(s) and/or objectives defined by the user 240 for the online advertisement campaign are estimated and/or found to be impractical or underachieving relative to market standards. The user 240 may then add, remove and/or change one or more of the policy settings to adjust the defined goal(s).

By generating the alerts, the campaign editor 220 may release the user 240 from constantly monitoring and analyzing the performance of the online advertisement campaign to identify possible improvements. The campaign editor 220 may provide the user 240 with directed alerts recommending specific actions and/or alterations to the policy setting(s) of the online advertisement campaign.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method of reducing computation of a system configured for dynamically expanding an online advertisement campaign in real-time, comprising:
   using at least one processor of a campaign manager system for:
      receiving an advertisement policy for an online advertisement campaign for at least one offered item, said advertisement policy includes at least one policy setting:
      communicating, via at least one network, with a plurality of advertisement exchange services, to continuously explore and identify at least one new online advertisement space offered by a plurality of websites and/or mobile applications for presenting advertisement content to visitors;
      adding said at least one new online advertisement space to a pool of a plurality of available online advertisement spaces; and
      expanding automatically said online advertisement campaign through a plurality of iterations, wherein in each iteration at least one high performing candidate online advertisement space is identified by evaluating its performance during small-scale testing and added to a group of large-scale online advertisement spaces, each iteration comprising:
         applying at least one learning algorithm to analyze performance data to predict a performance of at least one online advertisement space not previously used for said online advertisement campaign, wherein said at least one online advertisement space not previously used for said online advertisement campaign shares at least one similarity pattern with at least one used online advertisement space,
         identifying candidate online advertisement spaces that are predicted to present high performance based on the analyzed performance data and adding at least one of said plurality of available online advertisement spaces to a test group comprising a plurality of candidate online advertisement spaces selected for a small-scale test according to said at least one policy setting,
         communicating with at least one of said plurality of advertisement exchange services to bid, in real-time, for purchasing each of said plurality of candidate online advertisement spaces of said test group,
         posting at least one advertisement generated according to said at least one policy setting at said each candidate online advertisement space which is successfully purchased,
         calculating an aggregated performance score for said each candidate online advertisement space based on a performance measured for said at least one advertisement posted at said each candidate online advertisement space, wherein said aggregated performance score is calculated by analyzing a conversion count achieved by said at least one advertisement posted at said each candidate online advertisement space compared to a price of said each candidate online advertisement space,
         analyzing said aggregated performance score of said each candidate online advertisement space with respect to said at least one policy setting,
         training the said at least one learning algorithm applied for the small-scale test using said aggregated performance score of said each candidate online advertisement space with respect to said at least one policy setting:
         identifying each candidate online advertisement space having said aggregated performance score satisfying at least one criterion predefined by said at least one policy setting and adding the identified each candidate online advertisement space to a large-scale group comprising a plurality of online advertisement spaces selected for large-scale use, and
         communicating with said plurality of advertisement exchange services to bid, in real-time, for purchasing at least one of said plurality of online advertisement spaces of said large-scale group.

2. The method of claim 1, wherein said online advertisement campaign comprises at least one advertisement form selected from a group consisting of: web advertisement and application advertisement.

3. The method of claim 1, wherein said at least one policy setting relates to at least one of: said advertiser, said at least one offered item and said online advertisement campaign.

4. The method of claim 1, wherein said expansion is executed to optimize a performance of said online advertisement campaign while complying within at least one campaign constraint provided by said at least one policy setting.

5. The method of claim 1, wherein said at least one new online advertisement space is identified based on a similarity analysis of said at least one new online advertisement space compared to said online advertisement campaign, said at least one new online advertisement space shares at least one similarity pattern with said online advertisement campaign.

6. The method of claim 1, wherein said at least one new online advertisement space is identified based on a traffic analysis of visitors exposed to at least one advertisement posted at said at least one new online advertisement spaces.

7. The method of claim 1, wherein said at least one new online advertisement space is identified based on at least one competition advertisement posted by a competitor of said advertiser.

8. The method of claim 1, wherein said at least one new online advertisement space is selected randomly.

9. The method of claim 1, further comprising storing the performance data comprising said aggregated performance score for each of said plurality of purchased online advertisement spaces.

10. The method of claim 9, wherein said plurality of available online advertisement spaces is clustered based on an analysis of said performance data.

11. The method of claim 1, further comprising associating at least one of said plurality of available online advertisement spaces with at least one activation rule, said activation rule defines at least one use characteristic for using said at least one available online advertisement space.

12. The method of claim 1, wherein a bid price for said small-scale testing is adjusted during said bidding for purchasing at least one of said plurality of candidate online advertisement spaces to reach a pre-defined minimum number of exposures of said at least one purchased online advertisement space in order to allow calculation of said aggregated performance score.

13. The method of claim 1, wherein a bid price for said large-scale use is adjusted during said bidding for purchasing at least one large-scale online advertisement spaces of said group to meet a performance goal of said online advertisement campaign.

14. The method of claim 1, wherein at least one dropped online advertisement space is dropped from said group when said aggregated performance score of said at least one dropped online advertisement space fails to meet a performance goal of said online advertisement campaign.

15. The method of claim 1, wherein at least one replaced online advertisement space of said group is replaced with at least one of said plurality of candidate online advertisement spaces in case said aggregated performance score of said at least one candidate online advertisement space is better than said aggregated performance score of said at least one replaced online advertisement space.

16. The method of claim 1, wherein said at least one advertisement is created according to said at least one policy setting to fit said at least one purchased online advertisement space.

17. The method of claim 1, wherein said at least one advertisement incorporates at least one of a plurality of creative elements provided by said advertiser, said at least one creative element is selected according to at least one pattern of said at least one purchased online advertisement space to fit said at least one purchased online advertisement space.

18. The method of claim 17, further comprising said at least one advertisement is updated to replace said at least one creative element with a replacement creative element of said plurality of creative elements based on a performance analysis of said at least one advertisement with respect to said at least one creative element and said at least one purchased online advertisement space.

19. A system for dynamically expanding an online advertisement campaign in real-time requiring reduced computation, comprising:
a program store for storing a code;
at least one processor coupled to said program store, said at least one processor is adapted to execute said code, said code comprising:
code instructions to receive an advertisement policy for an online advertisement campaign for at least one offered item, said advertisement policy includes at least one policy setting; and
code instructions to communicate, via at least one network, with a plurality of advertisement exchange services, to explore and identify at least one new online advertisement space offered by a plurality of websites and/or mobile applications for presenting advertisement content to visitors;
code instructions to add said at least one new online advertisement space to a pool of a plurality of available online advertisement spaces; and
code instructions to expand automatically said online advertisement campaign through a plurality of iterations, wherein in each iteration at least one high performing candidate online advertisement space is identified by evaluating its performance during small-scale testing and added to a group of large-scale online advertisement spaces, each iteration comprising:
applying at, least one learning algorithm to analyze performance data to predict a performance of at least one online advertisement space not previously used for said online advertisement campaign, wherein said at least one online advertisement space not previously used for said online advertisement campaign shares at least one similarity pattern with at least one used online advertisement space,
identifying candidate online advertisement spaces that are predicted to present high performance based on the analyzed performance data and adding at least one of said plurality of available online advertisement spaces to a test group comprising a plurality of candidate online advertisement spaces selected for a small-scale test according to said at least one policy setting,
communicating with at least one of said plurality of advertisement exchange services to bid, in real-time, for purchasing each of said plurality of candidate online advertisement spaces of said test group,
posting at least one advertisement generated according to said at least one policy setting at said each candidate online advertisement space which is successfully purchased,
calculating an aggregated performance score for said each candidate online advertisement space based on a performance measured for said at least one advertisement posted at said each candidate online advertisement space, wherein said aggregated performance score is calculated by analyzing a conversion count achieved by said at least one advertisement posted at said each candidate online advertisement space compared to a price of said each candidate online advertisement space,
analyzing said aggregated performance score of said each candidate online advertisement space with respect to said at least one policy setting,
training the said at least one learning algorithm applied for the small-scale test using said aggregated performance score of said each candidate online advertisement space with respect to said at least one policy setting;
identifying each candidate online advertisement space having said aggregated performance score satisfying at least one criterion predefined by said at least one policy setting and adding the identified each candidate online advertisement space to a large-scale group comprising a plurality of online advertisement spaces selected for large-scale use, and
communicating with said plurality of advertisement exchange services to bid, in real-time, for purchasing at least one of said plurality of online advertisement spaces of said large-scale group.

* * * * *